United States Patent [19]

Kurland et al.

[11] Patent Number: 5,497,056
[45] Date of Patent: Mar. 5, 1996

[54] METHOD AND SYSTEM FOR CONTROLLING A MOTORIZED WHEELCHAIR USING CONTROLLED BRAKING AND INCREMENTAL DISCRETE SPEEDS

[75] Inventors: Marvin Kurland, East Brunswick; Thomas J. Noonan, Neshanic; David L. Martin, West Trenton; Eric Z. Riffl, Hamilton Square, all of N.J.

[73] Assignee: Trenton State College, Trenton, N.J.

[21] Appl. No.: 241,146

[22] Filed: May 10, 1994

[51] Int. Cl.[6] .................................................. H02P 7/00
[52] U.S. Cl. ........................... 318/269; 180/907; 318/369
[58] Field of Search ................. 318/280–286, 318/66–72, 257, 268, 139, 432, 269, 258, 546, 544, 550, 369; 180/6.5, 65.8, 169, 157, 167, 907; 388/907.5, 904, 930, 932, 827, 838, 839; 364/424.01, 424.05, 424.02, 424.1, 426.04; 395/105, 905, 913

[56] References Cited

U.S. PATENT DOCUMENTS

| | | | |
|---|---|---|---|
| 3,909,689 | 9/1975 | Selby et al. | 318/257 |
| 3,993,154 | 11/1976 | Simmons et al. | 180/77 R |
| 4,207,959 | 6/1980 | Youdin et al. | 180/167 |
| 4,511,825 | 4/1985 | Klimo | 318/67 |
| 4,840,634 | 6/1989 | Muller et al. | 623/24 |
| 4,906,906 | 3/1990 | Lautzenhiser et al. | 318/269 |
| 4,931,937 | 6/1990 | Kakinami et al. | 364/424.01 |
| 5,006,988 | 4/1991 | Borenstein et al. | 364/424.02 |
| 5,033,000 | 7/1991 | Littlejohn et al. | 364/424.05 |
| 5,065,320 | 11/1991 | Hayashi et al. | 364/424.01 |
| 5,076,384 | 12/1991 | Wada et al. | 180/169 |
| 5,186,269 | 2/1993 | Avakian et al. | 180/385 |
| 5,234,066 | 8/1993 | Ahsing et al. | 180/6.5 |
| 5,248,007 | 9/1993 | Watkins et al. | 180/65.8 |
| 5,270,624 | 12/1993 | Lautzenhiser | 318/432 |
| 5,274,311 | 12/1993 | Littlejohn et al. | 318/139 X |

*Primary Examiner*—Jonathan Wysocki
*Attorney, Agent, or Firm*—Woodcock Washburn Kurtz Mackiewicz & Norris

[57] ABSTRACT

Method and system for controlling the operation of a motorized wheelchair where the motors have discrete predetermined speeds thus requiring little user intervention to operate and the motors may be controlled to act as generators to provide dynamic braking of the wheelchair.

20 Claims, 5 Drawing Sheets

5,497,056

1

METHOD AND SYSTEM FOR CONTROLLING A MOTORIZED WHEELCHAIR USING CONTROLLED BRAKING AND INCREMENTAL DISCRETE SPEEDS

FIELD OF THE INVENTION

The present invention is embodied in motorized wheelchairs, more particularly, in motorized wheelchairs having computer controlled movement in response to commands from the user of the wheelchair.

BACKGROUND OF THE INVENTION

Motorized wheelchairs are commonly controlled by a joystick where movement of the joystick by the user of the wheelchair is translated into a directional or speed change in the movement of the wheelchair. Users with limited dexterity, however, may not be able to properly operate the joystick resulting in erratic movement of the wheelchair and possible collisions with objects.

A system which attempts to aid users with limited dexterity is described by Littlejohn et al. in U.S. Pat. No. 5,033,000. In this system, a control processor is used to filter the output of a joystick or other interface according to an algorithm developed for the user's particular needs. Depending on the severity of the user's limited dexterity, the system may still be difficult to operate. In addition, this system may be expensive to produce for the limited population of wheelchair users who may require a motorized wheelchair which may be operated by an individual with severely limited dexterity.

SUMMARY OF THE INVENTION

It is an object of the present invention to provide an inexpensive method and system for allowing a user with severely limited dexterity to operate a motorized wheelchair without producing erratic movement of the wheelchair or colliding with objects.

According to one aspect of the present invention, a method of controlling a motor of a wheelchair operated by a user with severely limited dexterity includes the steps of receiving a change speed command from the user of the wheelchair and selecting, as a function of said change speed command, one of a plurality of predetermined motor speeds. The method also includes the step of controlling said motor of said wheelchair to operate at substantially the selected predetermined motor speed.

In a further aspect of this invention, there is one discrete predetermined speed for the motor corresponding to the wheelchair traveling in a substantially reverse direction and there are three discrete predetermined speeds for the motor corresponding to the wheelchair traveling in a substantially forward direction.

In a further aspect of the invention, the method also includes the steps of receiving information indicating the presence of a closest obstacle in the path of the wheelchair; and controlling said motor of said wheelchair as a function of said received information.

In addition, in the one step said motor is used as a generator to provide dynamic braking of said wheelchair if the received information indicates the presence of an obstacle within a predetermined interval. The predetermined interval may be selected as a function of the weight of the user of the wheelchair and a coefficient of friction between the user and the wheelchair.

In another aspect of the invention, the step of controlling the motors includes that steps of waiting a predetermined interval of time and controlling said motor of said wheelchair to operate at substantially the selected predetermined motor speed. The predetermined interval of time may vary as a function of a current speed setting of the motor.

In further aspect of the invention, the method also includes the steps of receiving a stop command from the user of the wheelchair and controlling said motor of said wheelchair to operate as a generator to provide dynamic braking of said wheelchair as a function of said stop command.

DETAILED DESCRIPTION OF PREFERRED EMBODIMENTS

Figure 1:
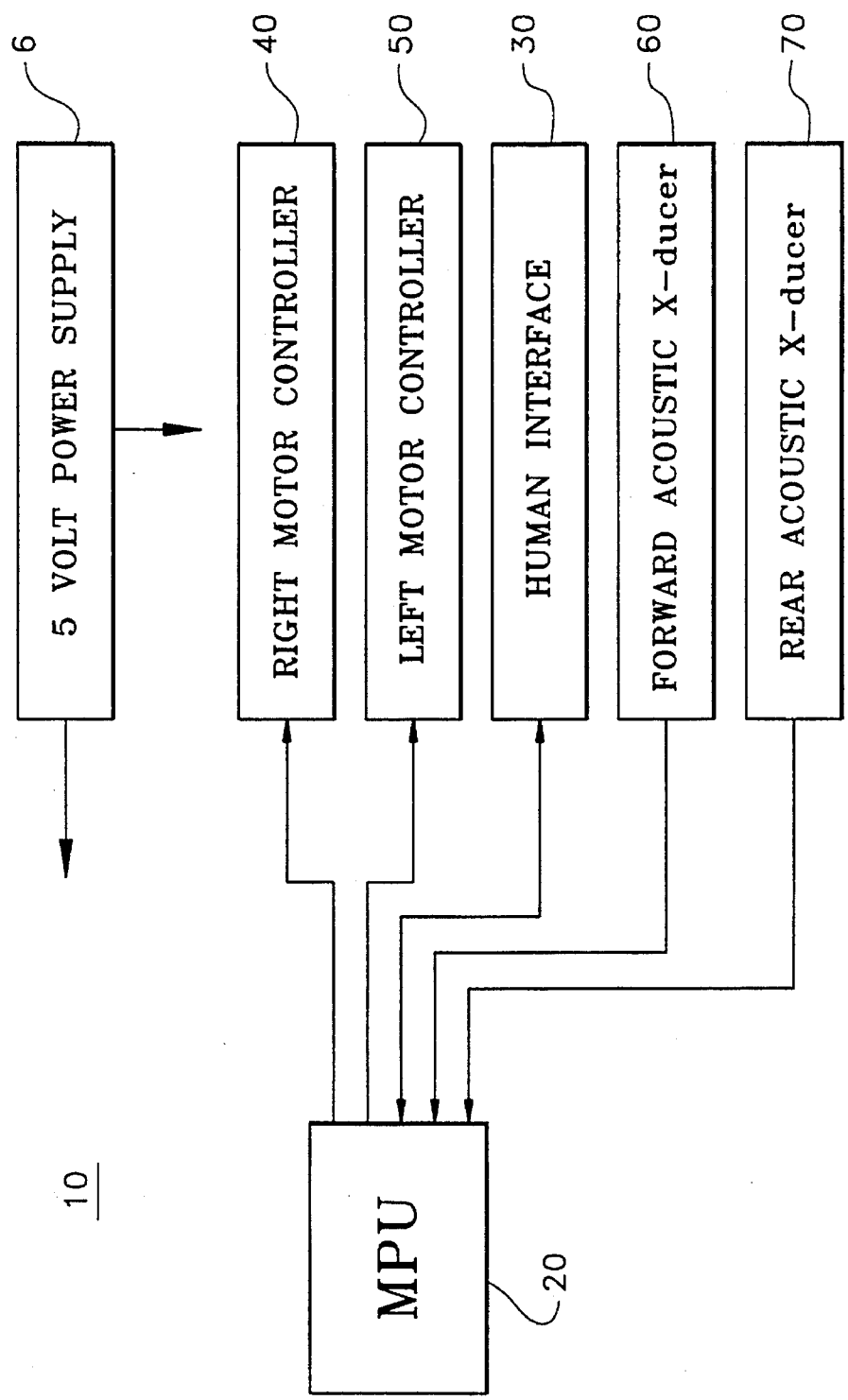
FIG. 1 is a block diagram of an exemplary overall control system for a motorized wheelchair.

An exemplary configuration of an overall control system embodying this invention is shown in FIG. 1. A brief overview of the invention is presented by reference to this exemplary overall control system 10. As shown in FIG. 1, the system 10 includes a main processing unit ("MPU") 20, 5 volt power supply 6, human interface 30, right and left motor controllers 40 and 50, and forward and rear acoustic transducer ("x-ducer") units 60 and 70.

The MPU 20 controls the operation of right and left motor controllers 40 and 50 based on data received from human interface 30, and forward and rear acoustic transducer ("x-ducer") units 60 and 70. The right and left motor controllers 40 and 50 in turn control the operation of the right and left motor of a wheelchair (not shown) based on data received from MPU 20. The 5 volt power supply 6 supplies power to each component in the system 10.

In the preferred embodiment of the invention, the human interface 30 provides the MPU 20 with data corresponding to seven different commands. The seven commands are stop, left, right, increase speed, lower speed, forward, and reverse. In the preferred embodiment of the invention, the forward and rear acoustic x-ducer units 60 and 70 may provide the MPU 20 with data concerning the presence of an object in front of the applicable transducer. In the preferred embodiment of the invention, either both, one, or no x-ducer units 60 and 70 may be turned on. The MPU 20 receives data from the active x-ducer units and determines the appropriate control of the left and right motors as a function of the data and passes the appropriate control data to the left and right motor controllers 40 and 50.

In more detail, when the system 10 is first powered up (turned on), the system 10 performs a self test and then may flash LED 1 (FIG. 2) or sound a buzzer (not shown). At this point the motors are stopped and a left, right, or lower speed command received from the human interface 30 will be discarded. In the exemplary embodiment of the invention, the direction the motors will rotate, i.e., forward or reverse, is set to either forward or reverse; there is no neutral mode. If a increase speed command is received, after a predetermined delay, the MPU 20 will direct the motor controllers 40 and 50 to bring the motors to a first predetermined forward speed or to the one reverse speed as a function of the selection of the motor direction. In the preferred embodiment of the invention, the MPU 20 permits the selection of three discrete forward speeds and one discrete reverse speed. This has been found to be desirable for severely handicapped individuals because the wheelchair operates without further operator intervention, thus requiring only limited dexterity to control.

Once a predetermined speed is selected, any of the commands from the human interface 30 will cause a change in the speed of the motors 90. If a left or right command is received from the human interface 30, the MPU 20, after a predetermined delay, will direct the motor controllers 40 and 50 to change the direction of the wheelchair either left or right by an incremental amount. In the preferred embodiment, if the motor direction is forward and the speed is currently set at one or two, an increase speed command will cause the MPU 20 to increase the speed setting to two or three after a predetermined delay. If the motor direction is forward and the speed setting three or the motor direction is reverse and the speed setting one, an increase speed command received by the MPU 20 from the human interface 30 will cause the MPU 20 to direct the motor controllers 40 and 50 to change the speed setting to zero after a predetermined delay and thus to stop the motors 90.

A lower speed command received from the human interface 30 by the MPU 20, will cause the MPU 20 to direct the motor controllers 40 and 50 to lower the speed setting. In particular, if the motor direction is forward and the speed setting is discrete speed 3 or 2, the speed setting will be lowered to discrete speed 2 or 1 after a predetermined interval. Regardless of the motor direction, if speed setting is one, the speed will be set to zero after a predetermined delay and the motors 90 will be stopped.

If a forward command is received from the human interface 30 when the current direction setting is reverse, or a reverse command when the current direction setting is forward, the speed will be set to zero after a predetermined delay and the motors 90 will be stopped. Then a subsequent increase speed command received from the human interface 30 will cause the MPU 20 to direct the motors 90 in the appropriate direction after a predetermined delay and the current direction setting will be changed.

Finally, if a stop command is received from the human interface 30 or a x-ducer unit 60 or 70 detects an object in the current direction of movement of the wheelchair, the MPU 20 will direct the motor controllers 40 and 50 to bring the motors 90 to a stop immediately (i.e., without a predetermined delay) using a dynamic braking technique where the motors 90 act as generators thereby decreasing the stopping distance and time. In the preferred embodiment of the invention, a stop command is issued by the MPU 20 when a x-ducer unit indicates that an object is less than five feet from the x-ducer. The stopping distance and time is selected as a function of the minimum weight of the user of the wheelchair and the user's coefficient of friction with the wheelchair. In particular, the stopping distance and time are selected so that the lightest user of the wheelchair will not slide during a stop.

All commands except the stop command are executed after a predetermined delay. The MPU 20 waits a predetermined delay to prevent erratic movement of the wheelchair in response to a command from the user. The length of the predetermined delay is set to the minimum time which will prevent erratic movement of the wheelchair in response to a command from the user and thus may vary as a function of the current speed setting of the wheelchair.

Figure 2:
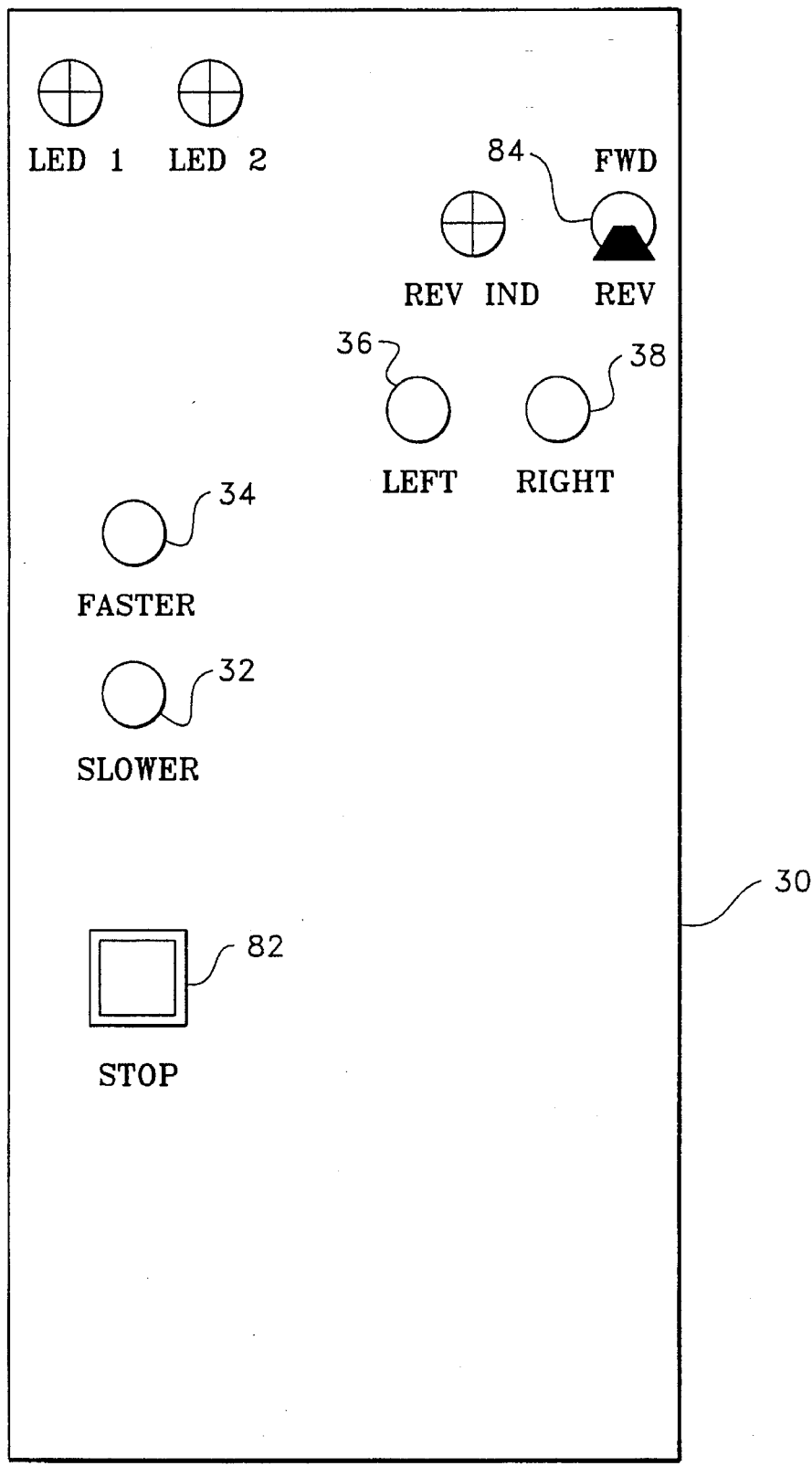
FIG. 2 is a block diagram of an exemplary human interface as shown in FIG. 1.

In the preferred embodiment of the invention, the user generates one of the seven commands using the human interface shown in FIG. 2. The human interface 30 shown in FIG. 2 is a keypad interface where the stop, left, right, increase speed, lower speed commands are issued by depressing keypads 82, 36, 38, 34, and 32, respectively. In the preferred embodiment of the invention, the forward and reverse commands are issued from a toggle switch 84. The toggle switch is either in the forward or reverse position and thus the user of the human interface 30 issues a reverse or forward direction command, i.e., from forward to reverse, or reverse to forward, by toggling the switch position. As noted above, when the user toggles the switch 84, the MPU 20 directs the motor controllers 40 and 50 to bring the motors 90 to a complete stop and then the MPU 20 changes the current direction setting accordingly.

In the preferred embodiment of the invention, the human interface also has light emitting diodes ("LEDs") which are used to indicate the speed and direction status of the motors 90. LED 1 and LED 2 are used to indicate the current speed setting. If LED 1 alone is on, then the speed setting is one. If LED 2 alone is on, then the speed setting is two. If LED 1 and 2 are both on, then the speed setting is three. The REV IND is on when the direction setting is reverse and off otherwise. The operation of the LEDs of the human interface 30 is controlled by the MPU 20.

Figure 3:
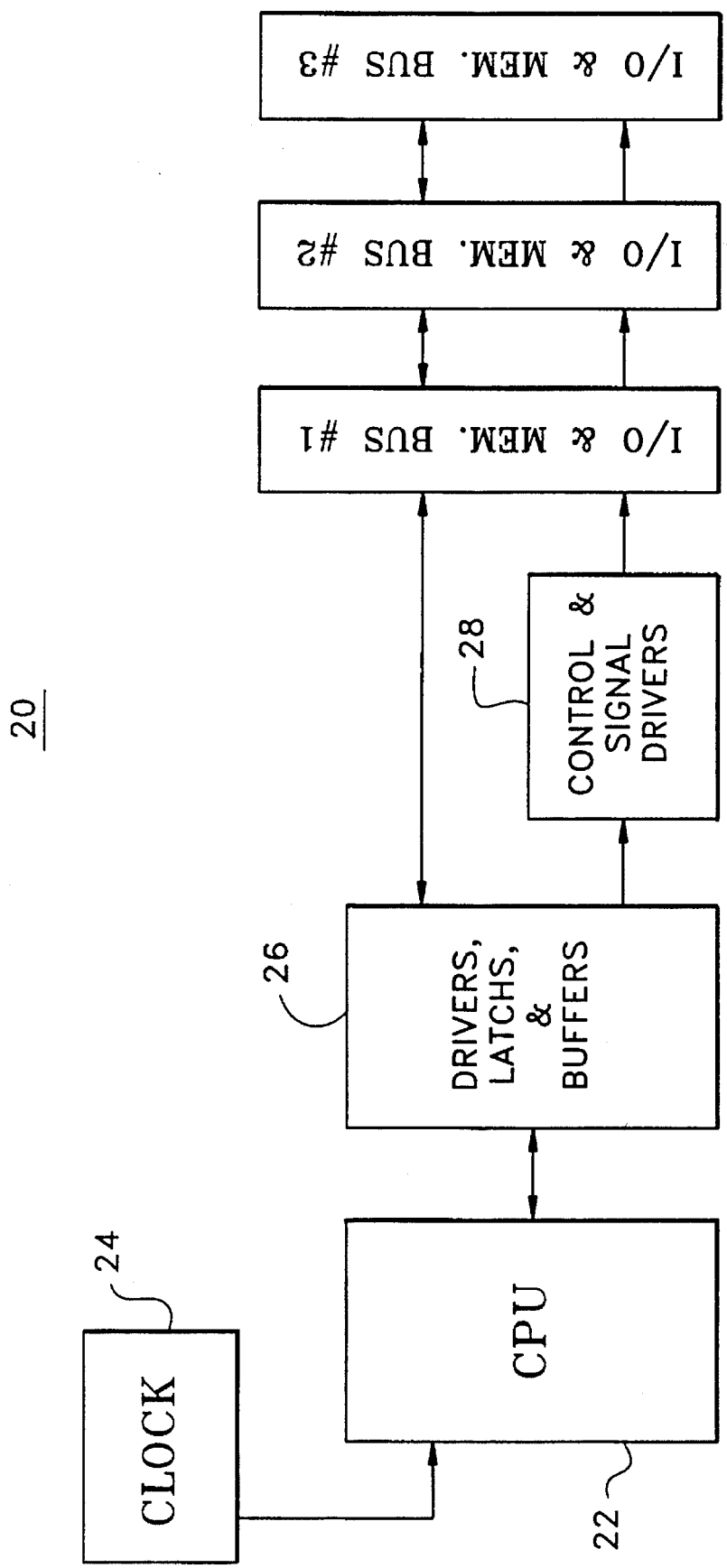
FIG. 3 is a block diagram of an exemplary main processing unit ("MPU") as shown in FIG. 1.

FIG. 3 illustrates a preferred embodiment of the MPU 20 of this invention. As shown in this Figure, the MPU includes a clock 24, central processing unit ("CPU") 22, drivers, latches, and buffers unit 26, control and signal drivers unit 28 and input output ("I/O") and memory ("mem") buses 1, 2, and 3. In the preferred embodiment of the invention, the CPU 22 is an Intel® 8808A microprocessor. The clock 24 is a 4.77 Mhz clock which is the timing signal for all the elements of control system 10 except for the x-ducer units 60 and 70. The drivers, latches and buffers unit 26 is used to demultiplex the CPU's 22 addresses and to buffer the CPU 22 from the I/O buses 1, 2, and 3 and the control and signal drivers unit 28.

The control and signal drivers unit 28 accepts signals from the CPU 22 via the drivers, latches, and buffers unit 26 and generates the signals to be sent to the motor controllers 40 and 50 and human interface 30 via the I/O buses 1, 2, and 3. The I/O buses 1, 2, and 3 are used to transmit controls generated by the CPU 22 and latches in the drivers, latches, and buffers unit 26. The I/O buses also communicate with Read Only Memory ("ROM") (not shown) and Random Access Memory (RAM) (not shown) where the ROM contains the program code for the CPU 22 and the RAM is used to store control and status information.

In operation, when a user depresses a keypad on the human interface 30, the depression is latched and communicated to the CPU 22 via the I/O buses and the drivers, latches and buffers unit 26. The CPU 22, based on the program code in the ROM, the current direction and speed settings and data from the x-ducers units 60 and 70, will generate the appropriate motor speed commands for the motor controllers 40 and 50 and status indicators for the human interface 30. The motor speed commands and status indicators are transferred to motor controllers and human interface via the drivers, latches and buffers unit 26, control and signal drivers unit 28 and the I/O buses.

As noted above, in operation, the CPU 22 will delay a predetermined period of time before executing any command received from the human interface 30 except for the stop command. If the stop command is received by the CPU 22 via the other units of the MPU 20, the CPU will immediately disregard all other commands it previously received and then instruct the motor controllers 40 and 50 to bring the motors 90 to the fastest safe stop using dynamic braking.

In another exemplary embodiment of the invention, the human interface 30 includes a speech detection and conversion device (not shown). In this embodiment, the user of the wheelchair may speak a phrase which corresponds to each of the seven commands. The selection of the phrase corresponding to each command may be programmed by the user, i.e., the word "stop" would not be required to be spoken by the user to indicate the selection of the stop command, the user may indicate any distinguishable sound to indicate the selection of the stop command. The speech detection and conversion unit would detect and convert the sound made by the user to one of the seven commands and transmit the appropriate command to the MPU 20.

Figure 4:
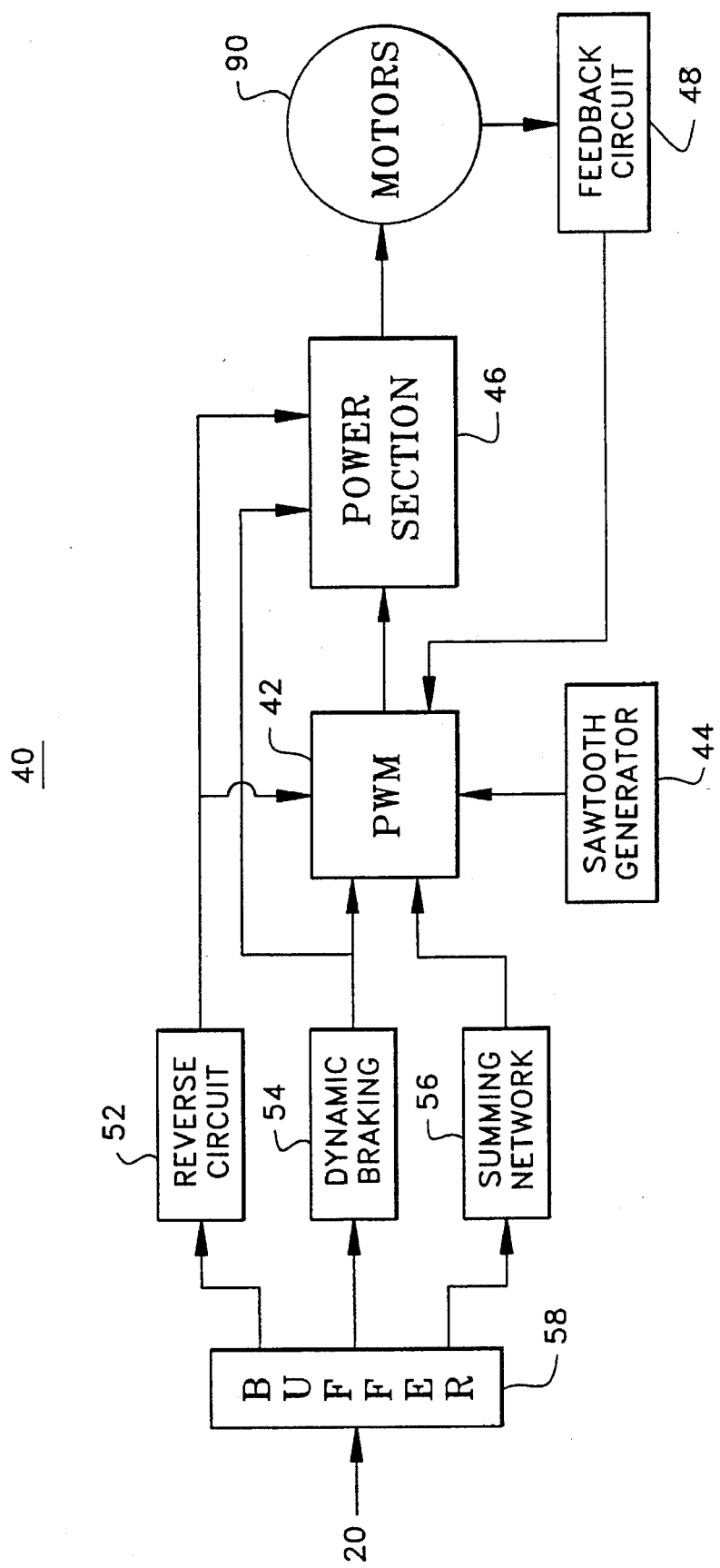
FIG. 4 is a block diagram of an exemplary motor controller as shown in FIG. 1.

An exemplary left or right motor control unit 40 or 50 in accordance with the present invention is shown in FIG. 4. Reference will only made only to the right motor controller 40 because the left motor controller 50 is identical to the right motor controller 40. As shown in this Figure, the motor controller 40 includes a buffer 58, reverse circuit 52, dynamic braking unit 54, summing network 56, Pulse Width Modulator ("PWM") 42, sawtooth generator 44, power section 46 and feedback circuit 48. The buffer unit 58 is used to buffer the motor speed command received from the MPU 20 which indicates the required operation of the motor 90 by the motor controller.

In the preferred embodiment of the invention, the motors are controlled to travel at three distinct speeds in the forward direction and one discrete speed in the reverse direction. The speeds selected in the preferred embodiment of the invention are 100, 200, and 300 revolutions per minute ("RPM") in the forward direction, and 160 RPM in the reverse direction. In addition, in the preferred embodiment of the invention, the motors are used as generators in a dynamic braking mode to provide the fastest possible stopping time and distance based on the minimal possible weight of the user and coefficient of friction between the user and the wheelchair. In the preferred embodiment of the invention, the minimum stopping distance was determined to be about 2 feet. In the preferred embodiment of the invention, the motor speed command is an 8 bit word where 3 bits are used to designate the forward speed, 1 bit to indicate dynamic stopping, and 1 bit to indicate reverse speed.

The reverse circuit determines whether the reverse bit in the buffered motor speed command byte is set and if the bit is set, controls the PWM 42 and power section 46 to drive the motors in reverse. Similarly, the dynamic braking unit 54 determines whether the dynamic braking bit in the buffered motor speed command byte is set and if the bit is set, controls the PWM 42 and power section 46 to make the motors act as generators. Finally, the summing network 56 sums the three bits representing the forward speed to determine the current forward speed setting, i.e., from 0 to 3. If the current forward speed setting is from 1 to 3, the summing network 56 controls the PWM 42 and power section 46 to make the motors operate in the current forward speed selection. In the preferred embodiment of the invention, the forward speeds are 100, 200, and 300 RPM.

The sawtooth generator 44 provides a sawtooth waveform which is used by the PWM 42 to generate a pulse width modulated signal in accordance with the control of the reverse circuit 52, dynamic braking unit 54, or summing network 56. In addition, the PWM 42 uses output from the feedback circuit 48 to provide the power section with the appropriate pulse width modulated signal. The power section 46 uses the pulse width modulated signal received from the PWM 42 and the power selection from the reverse circuit 52, dynamic braking unit 54, or summing network 56 to generate the pulse width modulated power signal to drive the motors 90.

In the preferred embodiment of the invention, in the dynamic braking mode, the armature is shorted so that the motor becomes a generator due to the momentum of the wheelchair. The torque produced by the motor in this mode of operation will be directly proportional to the speed of the wheelchair so that the faster the speed of the chair the greater the braking. If no bits are set in the motor speed command, the motor controller 40 will not generate a power signal for the motor 90, however, the armature will not be shorted. In this situation, the wheelchair will coast to a stop. This situation may occur when the user depresses the slower speed key 32 when the current speed setting is one regardless of the direction. This situation may also occur if a x-ducer 60 or 70 detects an obstacle in the path of the wheelchair that is not too close yet. If an x-ducer 60 or 70 detects a fairly close object in the path of the wheelchair (for example less than 5 feet), the MPU 20 may direct the motor controllers 40 or 50 to perform dynamic braking.

Figure 5:
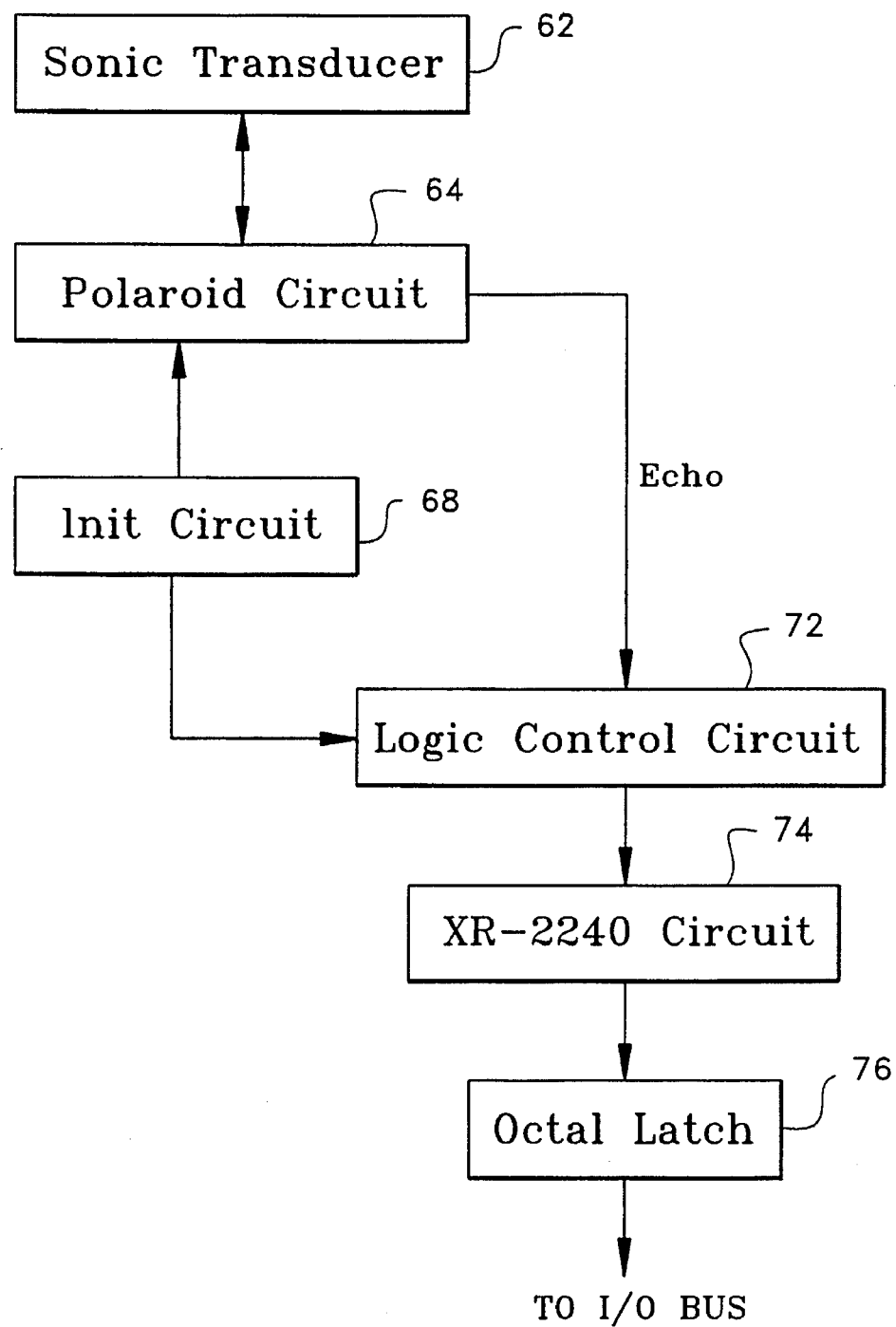
FIG. 5 is a block diagram of an exemplary acoustic transducer ("x-ducer") unit as shown in FIG. 1.

An exemplary forward or rear acoustic x-ducer unit 60 or 70 in accordance with the present invention is shown in FIG. 5. This unit determines the distance of the nearest obstacle in tenths of a foot (or in 1.2 inch increments). Reference will only made only to the forward x-ducer unit 60 because the rear x-ducer unit 70 is identical to the forward x-ducer unit 60. As shown in this FIG., the exemplary x-ducer unit 60 includes an Init Circuit 68, a Logic Control Circuit 72, an XR-2240 Circuit 74, a Polaroid Circuit 64, a sonic x-ducer 62 and an Octal Latch 76. The Init Circuit generates a 12 Hz signal which is transmitted to the polaroid circuit 64 and the Logic Control Circuit 72.

In operation, when the Logic Control Circuit 72 receives the rising edge of a pulse from the Init Circuit 68, the Logic Control Circuit 72 directs the XR-2240 Circuit 74 to clear a pulse counter. In addition, when the polaroid circuit 64 receives the rising edge of a pulse from the Init Circuit 68, the circuit 64 sends out an acoustic pulse via the x-ducer 62 and clears the echo output line. When the Logic Control Circuit 72 detects that the echo output line is cleared, the Logic Control Circuit 72 enables the XR-2240 Circuit 74. When the XR-2240 Circuit 74 is enabled, the circuit generates pulses at a 5.64 KHz rate and the pulse counter in the circuit counts the pulses the circuit generates. Each pulse generated by the XR-2240 Circuit 74 corresponds to 1.2 inches traveled by the acoustic pulse generated by the x-ducer 62 to and from an obstacle. When a return pulse is detected by the x-ducer 62, the polaroid circuit 64 sets the echo line. When the Logic Control Circuit 72 detects that the echo line is set, the Logic Control Circuit 72 directs the XR-2240 Circuit 74 to stop generating and counting pulses. The count in the pulse counter of the XR-2240 circuit 74 multiplied by the pulse distance conversion of 1 pulse per 1.2 inches yields the distance of the nearest obstacle to the x-ducer 62. The count in the counter is transmitted to the MPU 20 via the Octal Latch 76. The MPU 20 uses the count to determine whether to slow down or immediately stop the motors 90 as a function of the current speed setting of the motors and the distance of the nearest obstacle as indicated by the count. As noted above, either both, one, or no x-ducer unit 60 or 70 may be turned on at any time during the operation of the control system 10.

Although the invention has been described in terms of an exemplary embodiment, the spirit and scope of the appended claims are unlimited by any details not expressly stated in the claims. For example, a different human interface 30 may be used to provide the seven commands to the MPU 20.

What is claimed is:

1. A method of controlling a wheelchair operated by a user with severely limited dexterity, comprising the steps of:
   a) determining a braking interval as a function of the weight of the user of the wheelchair and a coefficient of friction between the user and the wheelchair; and
   b) braking the wheelchair as a function of the determined braking interval.

2. A method according to claim 1 wherein step b) comprises the steps of:
   i) receiving information indicating the presence of a closest obstacle in the path of the wheelchair; and
   ii) braking the wheelchair when the received information indicates the presence of an obstacle within the determined braking interval.

3. A method according to claim 1 wherein step b) comprises using a motor of the wheelchair as a generator to provide dynamic braking of the wheelchair as a function of the determined braking interval.

4. A method according to claim 2 wherein step ii) comprises using a motor of the wheelchair as a generator to provide dynamic braking of the wheelchair when the received information indicates the presence of an obstacle within the determined braking interval.

5. A method according to claim 1 wherein the wheelchair includes a pushbutton interface having at least a stop button and step b) comprises braking the wheelchair as a function of the determined braking interval when the stop button is depressed by the user.

6. A method according to claim 5 wherein the pushbutton interface further has at least an increase speed button and the method further comprises the steps:
   c) generating a change speed command when the user of the wheelchair depresses the increase speed button;
   d) selecting, as a function of the change speed command, one of a plurality of predetermined motor speeds; and
   e) controlling a motor of said wheelchair to operate at substantially the selected predetermined motor speed.

7. A method according to claim 6, where there is one discrete predetermined speed for the motor corresponding to the wheelchair traveling in a substantially reverse direction and there are three discrete predetermined speeds for the motor corresponding to the wheelchair traveling in a substantially forward direction.

8. A method according to claim 7, wherein step e) is comprised of the steps of:
   i) waiting a predetermined interval of time; and
   ii) controlling a motor of the wheelchair to operate at substantially the selected predetermined motor speed.

9. A system for controlling a wheelchair operated by a user with severely limited dexterity, comprising:
   means for generating a stop signal; and
   means for braking the wheelchair as a function of a predetermined braking interval when the stop signal is generated where the predetermined braking interval is selected as a function of the weight of the user of the wheelchair and a coefficient of friction between the user and the wheelchair.

10. A system according to claim 9 wherein the means for generating a stop signal comprises:
    means for receiving information indicating the presence of a closest obstacle in the path of the wheelchair; and
    means for generating a stop signal when the received information indicates the presence of an obstacle within the predetermined braking interval.

11. A system according to claim 9 further comprising a motor and wherein the means for braking comprises using the motor as a generator to provide dynamic braking of the wheelchair as a function of the predetermined braking interval.

12. A system according to claim 10 further comprising a motor and wherein the means for braking comprises using the motor as a generator to provide dynamic braking of the wheelchair.

13. A system according to claim 9 further comprising a pushbutton interface having at least a stop button and wherein the means for generating a stop signal generates a stop signal when the stop button is depressed by the user.

14. A system according to claim 13 wherein the pushbutton interface further includes at least an increase speed button and the system further comprises:
    means for generating a change speed command when the user of the wheelchair depresses the increase speed button;
    means for selecting, as a function of the change speed command, one of a plurality of predetermined motor speeds; and
    means for controlling the motor of said wheelchair to operate at substantially the selected predetermined motor speed.

15. A system according to claim 14, where there is one discrete predetermined speed for the motor corresponding to the wheelchair traveling in a substantially reverse direction and there are three discrete predetermined speeds for the motor corresponding to the wheelchair traveling in a substantially forward direction.

16. A system according to claim 15, wherein the means for controlling the motor comprises:
    means for waiting a predetermined interval of time; and
    means controlling a motor of the wheelchair to operate at substantially the selected predetermined motor speed after waiting the predetermined interval of time.

17. A system for controlling a wheelchair operated by a user with severely limited dexterity, comprising:
    a motor;
    a pushbutton interface having at least an increase speed button and a stop button;
    means for generating a change speed command when the user of the wheelchair depresses the increase speed button;
    means for selecting, as a function of the change speed command, one of a plurality of predetermined motor speeds;
    means for controlling the motor of said wheelchair to operate at substantially the selected predetermined motor speed; and means for braking the wheelchair when the stop button is depressed by the user.

18. A system according to claim 17, where there is one discrete predetermined speed for the motor corresponding to the wheelchair traveling in a substantially reverse direction and there are three discrete predetermined speeds for the motor corresponding to the wheelchair traveling in a substantially forward direction.

19. A system according to claim 18, wherein the means for controlling the motor comprises:

means for waiting a predetermined interval of time; and means controlling a motor of the wheelchair to operate at substantially the selected predetermined motor speed after waiting the predetermined interval of time.

20. A system according to claim 19 wherein the means for braking comprises using the motor as a generator to provide dynamic braking of the wheelchair.

\* \* \* \* \*